(12) United States Patent
Kobayashi

(10) Patent No.: US 10,755,107 B2
(45) Date of Patent: Aug. 25, 2020

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Masayuki Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 166 days.

(21) Appl. No.: 15/870,273

(22) Filed: Jan. 12, 2018

(65) Prior Publication Data

US 2018/0204071 A1 Jul. 19, 2018

(30) Foreign Application Priority Data

Jan. 17, 2017 (JP) ................ 2017-005967

(51) Int. Cl.
*G06K 9/00* (2006.01)
*G06T 7/70* (2017.01)

(52) U.S. Cl.
CPC ..... *G06K 9/00778* (2013.01); *G06K 9/00369* (2013.01); *G06T 7/70* (2017.01); *G06T 2207/30196* (2013.01); *G06T 2207/30232* (2013.01); *G06T 2207/30242* (2013.01)

(58) Field of Classification Search
None
See application file for complete search history.

(56) References Cited

U.S. PATENT DOCUMENTS

| | | | | |
|---|---|---|---|---|
| 5,097,328 A | * | 3/1992 | Boyette | G06Q 10/06 348/150 |
| 2007/0286220 A1 | * | 12/2007 | Stenning | G07C 11/00 370/412 |
| 2010/0117790 A1 | * | 5/2010 | Bayne | G07C 9/28 340/5.21 |
| 2010/0277276 A1 | * | 11/2010 | Bayne | G07C 9/28 340/5.21 |
| 2012/0020518 A1 | * | 1/2012 | Taguchi | G06T 7/292 382/103 |
| 2014/0240092 A1 | * | 8/2014 | Nielsen | G06Q 30/0272 340/5.81 |
| 2014/0257889 A1 | * | 9/2014 | Ashley, Jr. | G07C 9/28 705/7.11 |
| 2015/0350608 A1 | * | 12/2015 | Winter | G06T 7/20 382/103 |

(Continued)

FOREIGN PATENT DOCUMENTS

| | | | |
|---|---|---|---|
| JP | 2007-317052 | * | 12/2007 |
| JP | 2007-317052 A | | 12/2007 |

(Continued)

*Primary Examiner* — Randolph I Chu
(74) *Attorney, Agent, or Firm* — Canon U.S.A., Inc. IP Division

(57) ABSTRACT

An information processing apparatus, which predicts a waiting time with higher accuracy, acquires a number of objects waiting in a queue in a set area, changes the acquired number of objects in a case where the acquired number of acquired objects is less than or equal to a threshold, and predicts a waiting time of the queue, based on the changed number of acquired objects and a passage frequency in the queue.

25 Claims, 7 Drawing Sheets

(56) References Cited

U.S. PATENT DOCUMENTS

| | | | |
|---|---|---|---|
| 2016/0005053 A1* | 1/2016 | Klima | G06Q 10/06 |
| | | | 705/7.29 |
| 2016/0102490 A1* | 4/2016 | Kobler | E05F 15/73 |
| | | | 700/9 |
| 2016/0191865 A1* | 6/2016 | Beiser | G06K 9/00778 |
| | | | 348/156 |
| 2016/0224845 A1* | 8/2016 | Gyger | G06T 7/20 |
| 2016/0314353 A1* | 10/2016 | Winter | G06T 7/194 |
| 2017/0006429 A1* | 1/2017 | Douglas | H04W 4/027 |
| 2017/0220871 A1* | 8/2017 | Ikeda | G06K 9/00342 |
| 2018/0061081 A1* | 3/2018 | Nagao | G06K 9/00778 |
| 2018/0075461 A1* | 3/2018 | Hirakawa | G06Q 30/0204 |
| 2018/0188892 A1* | 7/2018 | Levac | G06Q 30/0261 |
| 2018/0204071 A1* | 7/2018 | Kobayashi | G06K 9/00778 |
| 2018/0268391 A1* | 9/2018 | Hayashi | G06Q 10/06 |
| 2018/0286068 A1* | 10/2018 | Matsubara | G06T 7/20 |
| 2018/0350179 A1* | 12/2018 | Yamashita | G06Q 10/04 |
| 2018/0365550 A1* | 12/2018 | Brown | G06M 11/00 |
| 2019/0251367 A1* | 8/2019 | Ida | G01C 21/3461 |
| 2019/0347885 A1* | 11/2019 | Galley | G06Q 10/02 |

FOREIGN PATENT DOCUMENTS

| | | | |
|---|---|---|---|
| JP | 2010-176225 A | | 8/2010 |
| JP | 2010176225 | * | 8/2010 |
| JP | 2011-096140 A | | 5/2011 |
| JP | 2011096140 | * | 5/2011 |
| JP | 2015-215787 A | | 12/2015 |

\* cited by examiner

WAITING-PERSON HEADCOUNT THRESHOLD = 1

WAITING-PERSON HEADCOUNT THRESHOLD = 2

INFORMATION PROCESSING APPARATUS, INFORMATION PROCESSING METHOD, AND RECORDING MEDIUM

BACKGROUND

Field

The present disclosure relates to an information processing apparatus, an information processing method, and a storage medium.

Description of the Related Art

As a technology for predicting a queue waiting time, there is a method for calculating a waiting time by determining a queue using data in which a velocity field label and a background difference label are combined (see Japanese Patent Application Laid-Open No. 2007-317052).

According to the technology discussed in Japanese Patent Application Laid-Open No. 2007-317052, it is necessary to track all human bodies within a monitored area, which incurs a large computation cost. In addition, there can be cases where a person not in a queue is determined to be waiting in the queue, so that accuracy of prediction of a waiting time is reduced.

SUMMARY

An information processing apparatus includes an acquisition unit configured to acquire a number of objects waiting in a queue in a set area, a change unit configured to change the number of objects acquired by the acquisition unit, in a case where the number of objects acquired by the acquisition unit is equal to or less than a threshold, and a prediction unit configured to predict a waiting time of the queue, based on the number of objects changed by the change unit, and a passage frequency in the queue.

Further features will become apparent from the following description of exemplary embodiments with reference to the attached drawings.

DESCRIPTION OF THE EMBODIMENTS

Exemplary embodiments will be described below with reference to the drawings.

Figure 1:
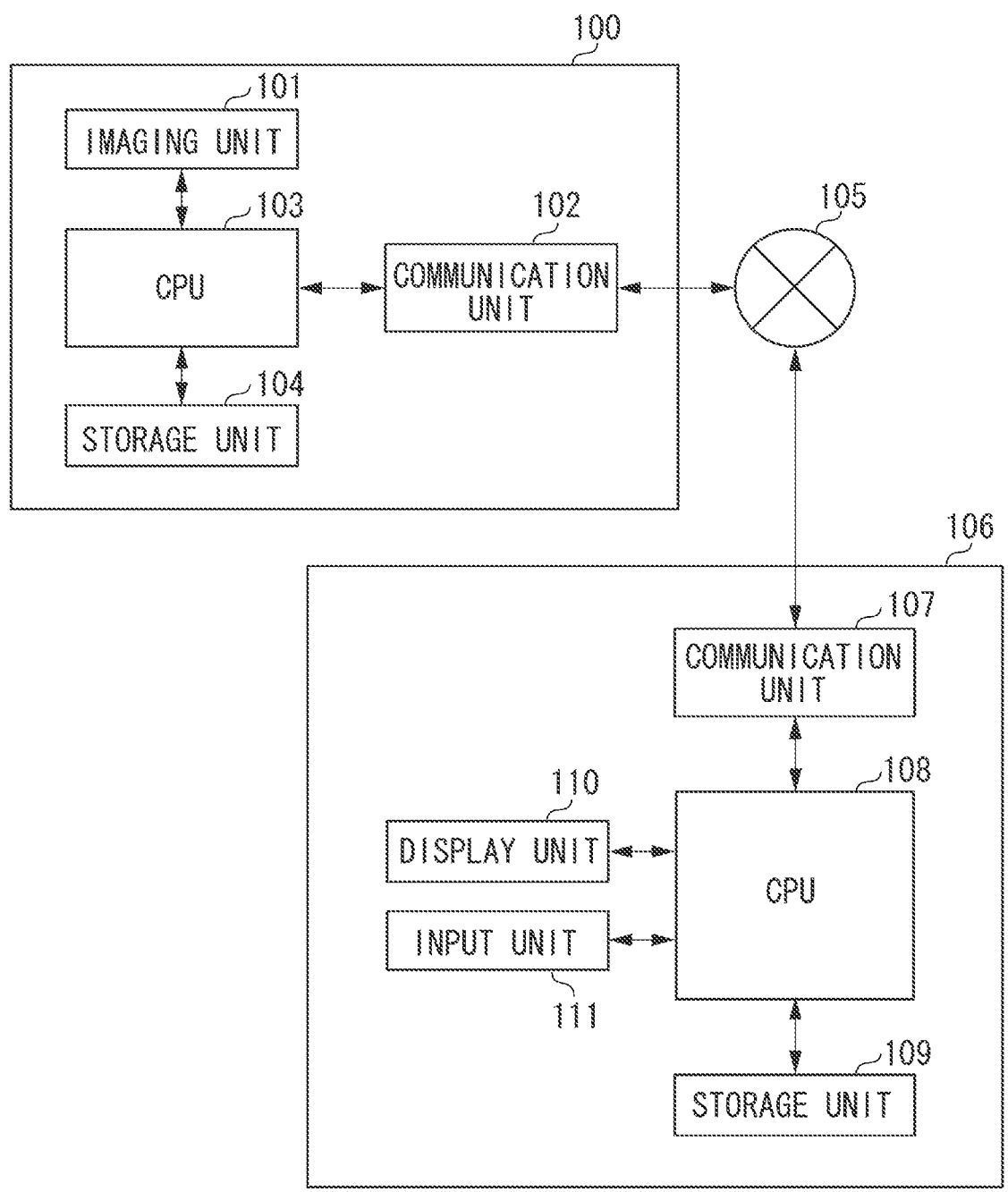
FIG. 1 is a diagram illustrating an example of a configuration of a queue waiting-time prediction system.

A first exemplary embodiment will be described below. FIG. 1 is a diagram illustrating an example of a configuration of a queue waiting-time prediction system and a hardware configuration of each apparatus included in the system. In the queue waiting-time prediction system, as illustrated in FIG. 1, an imaging apparatus 100 and an information processing apparatus 106 are connected to exchange information with each other via a network 105. The number of the imaging apparatuses 100 included in the system is not limited to just one. Two or more imaging apparatuses 100 can be included in the queue waiting-time prediction system.

The imaging apparatus 100 transmits a captured image to the information processing apparatus 106 via the network 105. The imaging apparatus 100 is, for example, a camera for capturing an image and is used, for example, for monitoring. The imaging apparatus 100 can be a camera mounted on a wall or a ceiling, and captures a moving image including one or more images. The imaging apparatus 100 can be compliant with, for example, Power over Ethernet® (PoE), and can be supplied with power via a local area network (LAN) cable. A configuration of the imaging apparatus 100 will be described next.

An imaging unit 101 includes a lens group in an imaging optical system and an imaging sensor. The imaging sensor is, for example, a complementary metal oxide semiconductor (CMOS) sensor. The imaging unit 101 performs image processing on an image obtained from the imaging sensor, and encodes a signal to output the encoded signal.

A communication unit 102 performs communication with the information processing apparatus 106 via the network 105. The communication can be wireless communication or can be performed via a wired LAN. Examples of the wireless communication include communication using a wireless personal area network (PAN) such as Bluetooth®, ZigBee®, and Ultra Wide Band (UWB). Additional examples of the wireless communication include using a wireless LAN, such as wireless fidelity (Wi-Fi®), using a wireless metropolitan area network (MAN), such as WiMAX®, and a wireless wide area network (WAN), such as LTE/3G. Examples of the wired LAN include configurations such as a plurality of routers, switches, and cables that meet a communication standard such as Ethernet. The communication unit 102 is not limited in terms of communication standard, scale, and configuration, as long as the communication unit 102 can communicate with an external device.

A central processing unit (CPU) 103 is an arithmetic processing unit that performs processing such as calculation and logical decision in each unit of the imaging apparatus 100. The functions and processing of the imaging apparatus 100 are implemented when the CPU 103 reads out a program stored in a storage unit 104 and executes the read program.

The storage unit 104 is a nonvolatile memory such as an electrically erasable programmable read only memory (EEPROM). The storage unit 104 stores various kinds of information. For example, the storage unit 104 can store an image captured by the imaging apparatus 100.

Next, the information processing apparatus 106 will be described. The information processing apparatus 106 can be, for example, a personal computer (PC), or can be a portable terminal, such as a tablet terminal or smartphone. A configuration of the information processing apparatus 106 will now be described. The information processing apparatus 106 includes a communication unit 107, a CPU 108, a storage unit 109, a display unit 110, and an input unit 111.

The communication unit 107 performs communication with the imaging apparatus 100 via the network 105 to receive images and various kinds of information.

The CPU 108 is an operation processing unit that performs processing, such as calculation and logical decision, in each unit of the information processing apparatus 106.

The storage unit 109 is a nonvolatile memory such as an EEPROM.

The display unit 110 displays contents, such as an image acquired from the imaging apparatus 100, and setting information of the imaging apparatus 100. The display unit 110 is provided in the information processing apparatus 106 in the present exemplary embodiment, but the configuration is not limited thereto. As another example, the display unit 110 does not need to be provided in the information processing apparatus 106, and the information processing apparatus 106 can control an external display apparatus via an interface.

The input unit 111 receives inputs of user instructions, such as a mouse input, a keyboard input, and a touch input. For example, in a case where the input unit 111 receives an instruction for changing the setting of the imaging apparatus 100, the CPU 108 generates a control command for changing the setting of the imaging apparatus 100 based on the instruction. The CPU 108 then outputs the generated control command to the imaging apparatus 100 via the communication unit 107. In this way, the imaging apparatus 100 can change the setting of the imaging apparatus 100 based on the control command acquired from the information processing apparatus 106.

A functional configuration of the information processing apparatus 106 illustrated in FIG. 3, described below, and processing of a flowchart illustrated in FIG. 4, described below, are implemented when the CPU 108 executes processing based on a program stored in the storage unit 109.

Figure 2:
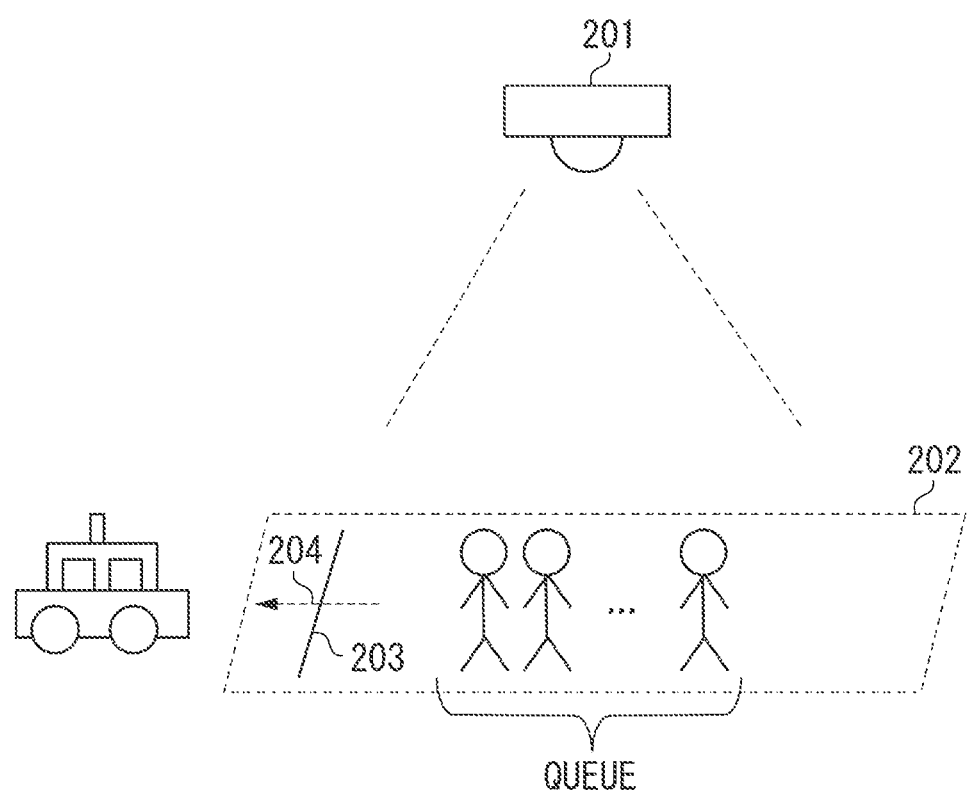
FIG. 2 is a diagram illustrating an example in which a queue waiting-time prediction system is applied to an actual environment.

FIG. 2 is a diagram illustrating an example in which a queue waiting-time prediction system is applied in an actual environment. The queue illustrated in FIG. 2 is a taxi waiting queue. An area 202 represents an area for taking a waiting-person headcount (i.e., counting the number of people waiting in queue) using a monitoring camera 201. The area 202 is an example of a set area. A passage detection line 203 is a line for determining whether a passage is detected (passage detection). A direction 204 represents a forward direction (a direction for performing the passage detection) of the queue. The passage detection line 203 is usually provided at the head of a queue for a service to be provided to human bodies included in the queue. The monitoring camera 201 is an apparatus similar to the imaging apparatus 100 illustrated in FIG. 1.

Figure 3:
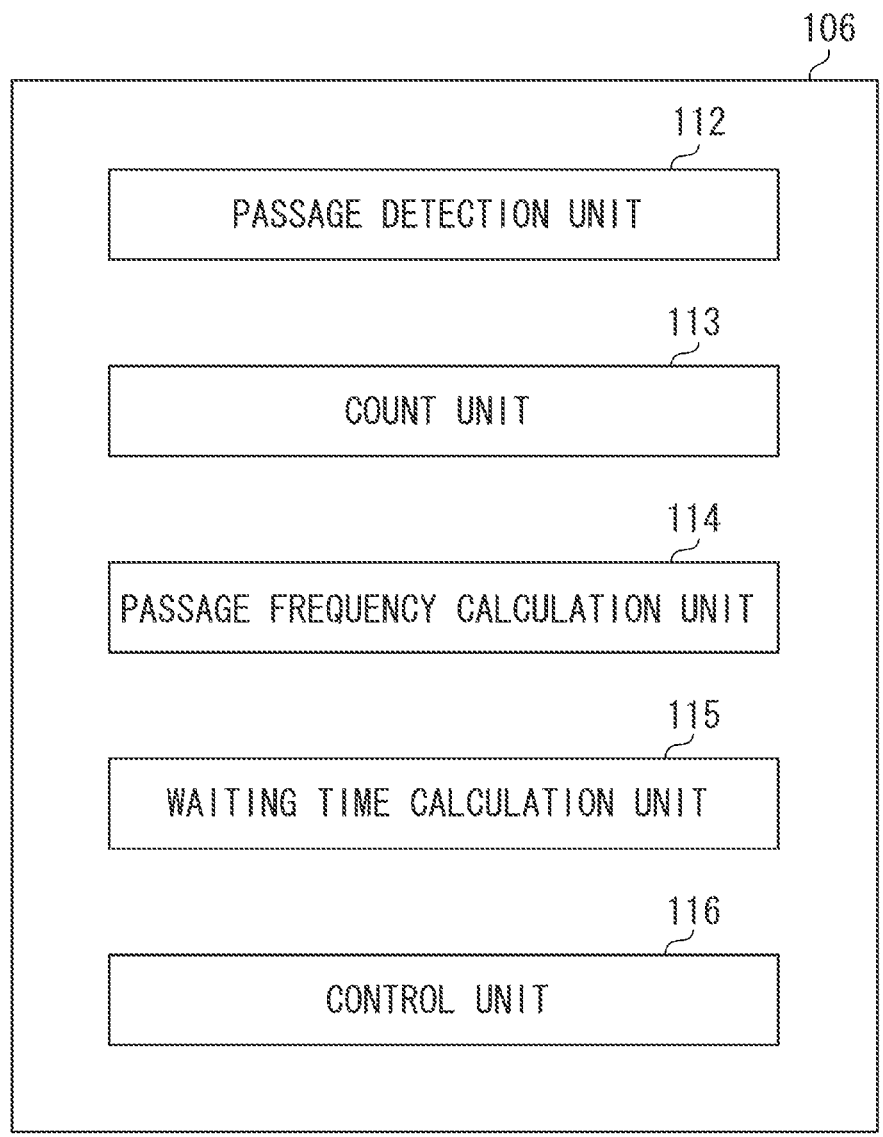
FIG. 3 is a diagram illustrating an example of a functional configuration of an information processing apparatus.

FIG. 3 is a diagram illustrating an example of the functional configuration of the information processing apparatus 106.

A passage detection unit 112 detects the passage of a human body over the passage detection line 203 by analyzing an image captured by the monitoring camera 201. Alternatively, the passage detection unit 112 can detect the passage of a human body over the passage detection line 203 based on a signal from a passage sensor provided in the monitoring camera 201 or installed near the passage detection line 203. FIG. 3 illustrates an example in which the passage detection unit 112 is implemented in the information processing apparatus 106. However, the passage detection unit 112 can be implemented in the monitoring camera 201. In a case where the passage detection unit 112 is implemented in the monitoring camera 201, the monitoring camera 201 transmits information detected by the passage detection unit 112 to the information processing apparatus 106. The passage detection unit 112 can detect the passage of a human body over the passage detection line 203 based on a result of analyzing an image captured by the monitoring camera 201, and a signal from the passage sensor. The detection of the passage of a human body over the passage detection line 203 is an example of detection of an object leaving a queue.

A count unit 113 acquires a headcount by detecting a human body based on an image from the monitoring camera 201, performing image processing, and analyzing a result of the image processing. A control unit 116 can preset an area in which a queue appears as the area 202 based on a user instruction provided via the input unit 111. The count unit 113 can use an image or respective images from one or more monitoring cameras 201, depending on the situation of an area where a queue is present.

A passage frequency calculation unit 114 calculates a passage frequency in the forward direction of the queue by determining how many human bodies are detected by the passage detection unit 112 within a predetermined time. For example, the passage frequency calculation unit 114 can calculate the frequency of an object leaving the queue (the number of objects leaving the queue per unit time) as the passage frequency.

A waiting time calculation unit 115 predicts a waiting time from the headcount calculated by the count unit 113 and the human-body passage frequency calculated by the passage frequency calculation unit 114, based on an interval set based on a user instruction provided via the input unit 111. The waiting time calculation unit 115 then records the predicted waiting time in a memory such as the storage unit 109.

The control unit 116 controls each function of the configuration illustrated in FIG. 3.

Figure 4:
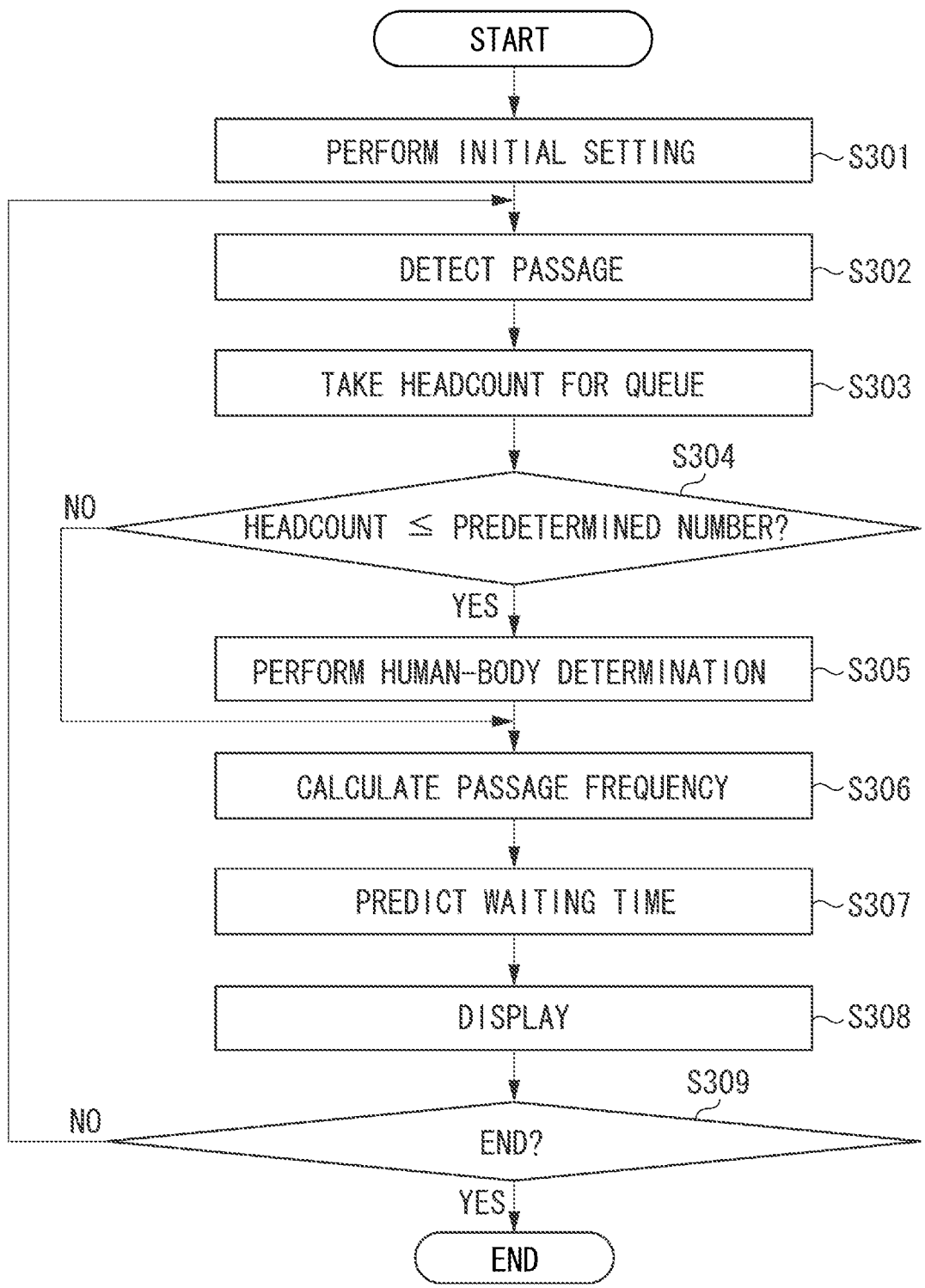
FIG. 4 is a flowchart illustrating an example of information processing.

FIG. 4 is a flowchart illustrating an example of information processing. The processing according to the flowchart of FIG. 4 begins, for example, upon startup of the queue waiting-time prediction system.

In step S301, the control unit 116 sets a counting area in the count unit 113 (performs initial setting) based on setting information. More specifically, first, the control unit 116 stores setting information indicating the counting area into the storage unit 109 based on a user instruction provided via the input unit 111. The control unit 116 then sets the counting area in the count unit 113 based on the setting information stored in the storage unit 109. The control unit 116 sets a threshold for a waiting-person headcount for performing human-body determination processing in the waiting time calculation unit 115. The control unit 116 sets a timing for performing waiting-time prediction in the passage frequency calculation unit 114 and the waiting time calculation unit 115. The control unit 116 does not necessarily perform these settings every time, and can read a value stored beforehand and set the read value. In a case where the number of human bodies not forming the queue, such as a staff, is known, the control unit 116 can use a predetermined number of human bodies as the threshold for the waiting-person headcount. In a case where the number of human bodies not the queue is unknown, the control unit 116 can automatically set the threshold based on the size of a counting area for performing counting.

In step S302, the passage detection unit 112 detects the passage of a human body based on a signal from a passage sensor and/or an image analysis result.

In step S303, the count unit 113 acquires a headcount of human bodies present in the counting area set in step S301. The count unit 113 sends the obtained headcount to the waiting time calculation unit 115.

In step S304, the waiting time calculation unit 115 determines whether the obtained headcount is less than or equal to the threshold set in step S301. If the obtained headcount less than or equal to the threshold (YES in step S304), the processing proceeds to step S305, in which the waiting time calculation unit 115 performs the human-body determination processing. If the obtained headcount is greater than the threshold (NO in step S305), the processing skips step S305 and proceeds to step S306, in which passage-frequency calculation processing is performed.

In step S305, the waiting time calculation unit 115 performs the determination processing for determining whether the human body counted in step S303 is a human body forming the queue. In the first exemplary embodiment, if the obtained headcount is less than or equal to the threshold set in step S301, the waiting time calculation unit 115 determines that the counted human body is not a human body forming the queue, and sets the value of the waiting-person headcount to 0 (zero) (sets a waiting-time prediction value to 0). In a case where a headcount of human bodies other than human bodies forming the queue, such as a staff, is known beforehand, this headcount is preset as the threshold in the initial processing in step S301, so that detection of a false queue can be prevented by performing the processing in step S305.

In step S306, the passage frequency calculation unit 114 calculates the frequency of passage of a human body in the forward direction of the queue within a predetermined time, from a result of detecting passage of a human body in the passage detection unit 112, based on the waiting-time prediction timing set in step S301.

In step S307, the waiting time calculation unit 115 calculates a waiting time, from the headcount calculated by the count unit 113 and the human-body passage frequency calculated by the passage frequency calculation unit 114, based on the waiting-time prediction timing set in step S301. The waiting time calculation unit 115 records the calculated waiting time. In this process, the waiting time calculation unit 115 calculates the waiting time based on the following expression.

$$WTp = QL/TH$$

WTp: Predicted waiting time
QL: Waiting-person headcount
TH: Passage frequency

In consideration of a case where the passage frequency becomes 0 at, for example, startup of the system, it is desirable that an initial value of the passage frequency be set beforehand.

In step S308, the control unit 116 displays the predicted waiting time calculated in step S307 in the display unit 110. The control unit 116 can display, in the display unit 110, data such as a predicted waiting time and a passage frequency in the past, based on the setting. The control unit 116 can perform predetermined display at the display unit 110 in a case where the passage frequency is 0.

In step S309, for example, the waiting time calculation unit 115 determines whether to end the processing for waiting-time prediction. If the waiting time calculation unit 115 continuously executes the processing for waiting-time prediction (NO in step S309), the processing returns to step S302. If the waiting time calculation unit 115 ends the processing for waiting-time prediction (YES in step S309), the processing of the flowchart illustrated in FIG. 3 ends.

Based on the processing in the present exemplary embodiment, human bodies forming a queue and other human bodies are distinguished from each other. Therefore, a reduction in accuracy of waiting-time prediction can be prevented.

A second exemplary embodiment will be described below. In the second exemplary embodiment, human-body determination processing different from the human-body determination processing of the first exemplary embodiment is performed in step S305. In the second exemplary embodiment, differences from the first exemplary embodiment will be mainly described.

In a case where no passage of a human body is detected in the passage detection unit 112 for a specified time, the waiting time calculation unit 115 determines that the counted human body is not a human body forming the queue, and sets the value of the waiting-person headcount to 0 (zero) (i.e., sets a waiting-time prediction value to 0). The control unit 116 registers the specified time beforehand at the time of the initial setting in step S301. For example, the control unit 116 stores setting information indicating the specified time in the storage unit 109 based on a user instruction provided via the input unit 111. In a case where no passage of a human body is detected in the passage detection unit 112 for the specified time, the waiting time calculation unit 115 determines, based on the setting information stored in the storage unit 109, that the counted human body is not a human body forming the queue. The waiting time calculation unit 115 then sets the value of the waiting-person headcount to 0 (i.e., sets the waiting-time prediction value to 0). Performing such processing enables distinguishing a person who is present in a counting area and stays in a queue, such as a staff. This enables prevention of detection of a false queue.

Based on the processing of the present exemplary embodiment, human bodies forming a queue and other human bodies are distinguished from each other. Therefore, a reduction in accuracy of waiting-time prediction can be prevented.

A third exemplary embodiment will be described below. In the third exemplary embodiment, human-body determination processing different from the human-body determination processing of each of the first and second exemplary embodiments is performed in step S305. In the third exemplary embodiment, differences from the above-described exemplary embodiments will be mainly described.

Figure 5:
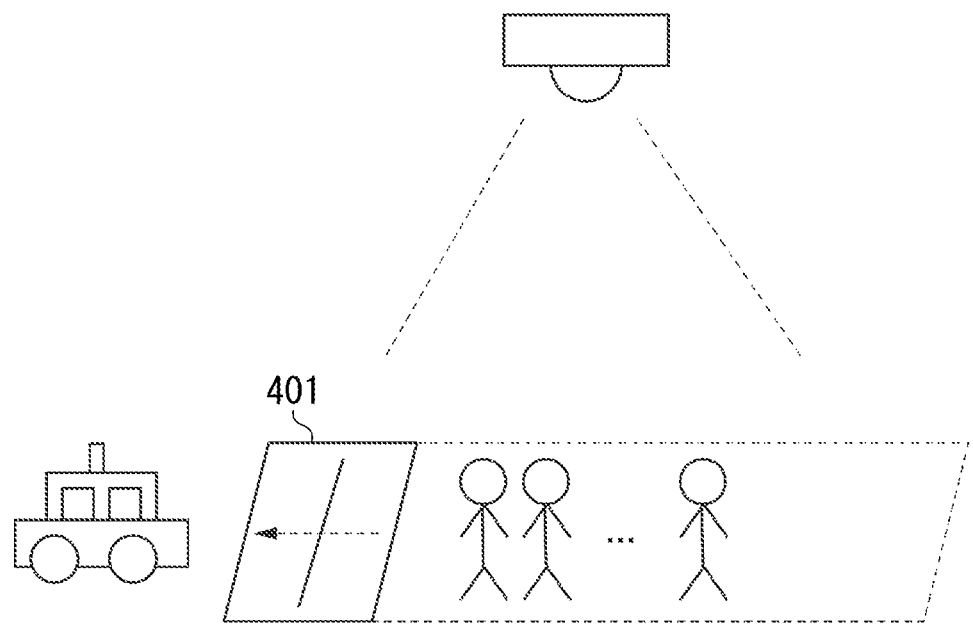
FIG. 5 is a diagram illustrating processing.

Specifically, as illustrated in FIG. 5, the control unit 116 registers beforehand a specified area 401 and a set period of time for performing the determination at the time of the initial setting in step S301. For example, the control unit 116 stores setting information indicating the specified area 401 and the set period of time in the storage unit 109 based on a user instruction provided via the input unit 111. In a case where no passage of a human body is detected in the specified area 401 for a certain period of time indicated by the set period of time, the waiting time calculation unit 115 determines, based on the setting information stored in the storage unit 109, that the human body counted in the count unit 113 is not a human body forming the queue. The waiting time calculation unit 115 then sets the value of the waiting-person headcount to 0 (i.e., sets the waiting-time prediction value to 0). Since a human body forming a queue is expected to be present near the head of the queue, by performing such processing, human bodies forming a queue and other human bodies can be distinguished from each other, and thus detection of a false queue can be prevented.

Based on the processing of the present exemplary embodiment, human bodies forming a queue and other human bodies are distinguished from each other. Therefore, a reduction in accuracy of waiting-time prediction can be prevented.

A fourth exemplary embodiment will be described below. In the first to third exemplary embodiments, the control unit 116 initially sets the area for taking a waiting-person headcount in the count unit 113 at the time of the initial setting, and the counting is performed in the fixed area afterward. However, the area for taking a waiting-person headcount can be variable.

Figure 6A:
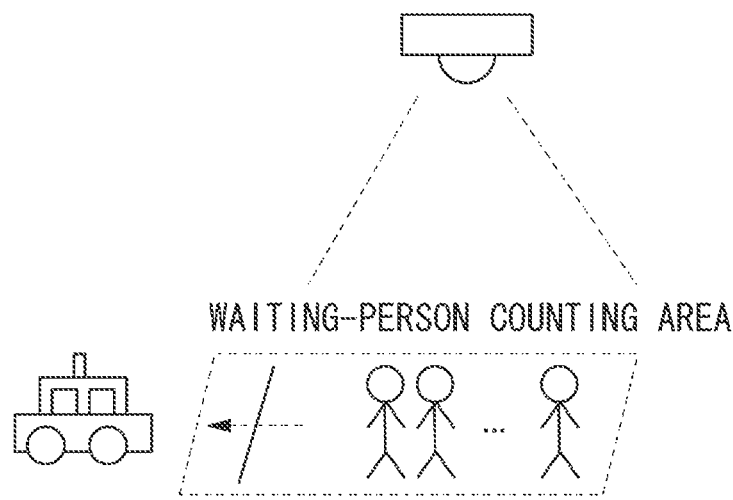
FIGS. 6A and 6B are diagrams illustrating processing.
Figure 6B:
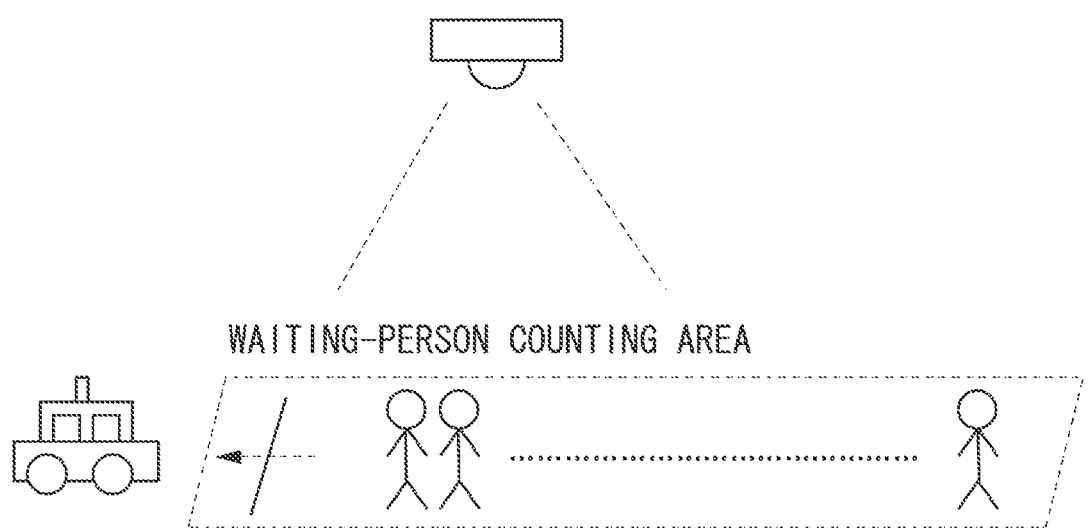

The control unit 116 can set a waiting-person counting area beforehand at the initial setting such that this area varies depending on the degree of congestion for each time period, based on a user instruction provided via the input unit 111. For example, as the initial setting, the control unit 116 stores, in the storage unit 109, setting information in which a time period and a waiting-person counting area are associated with each other based on a user instruction provided via the input unit 111. Performing such processing enables omitting detection in an unnecessary area. FIG. 6A illustrates an application example when the degree of congestion is small, and FIG. 6B illustrates an application example when the degree of congestion is large.

In the counting in step S303, the count unit 113 acquires the current time information, and acquires, from the setting information, a waiting-person counting area associated with the time period including the acquired time information. The count unit 113 then takes a count of human bodies present in the acquired waiting-person counting area.

The control unit 116, for example, can increase or decrease the waiting-person counting area, based on increase and decrease in the count of human bodies.

Figure 7A:
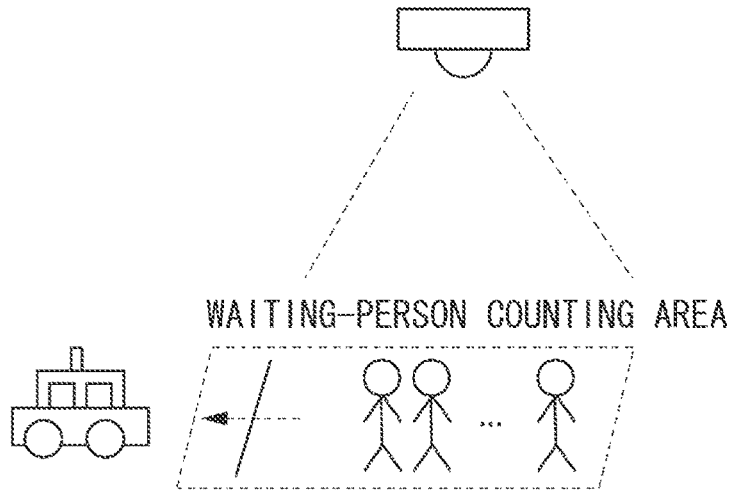
FIGS. 7A and 7B are diagrams illustrating processing.
Figure 7B:
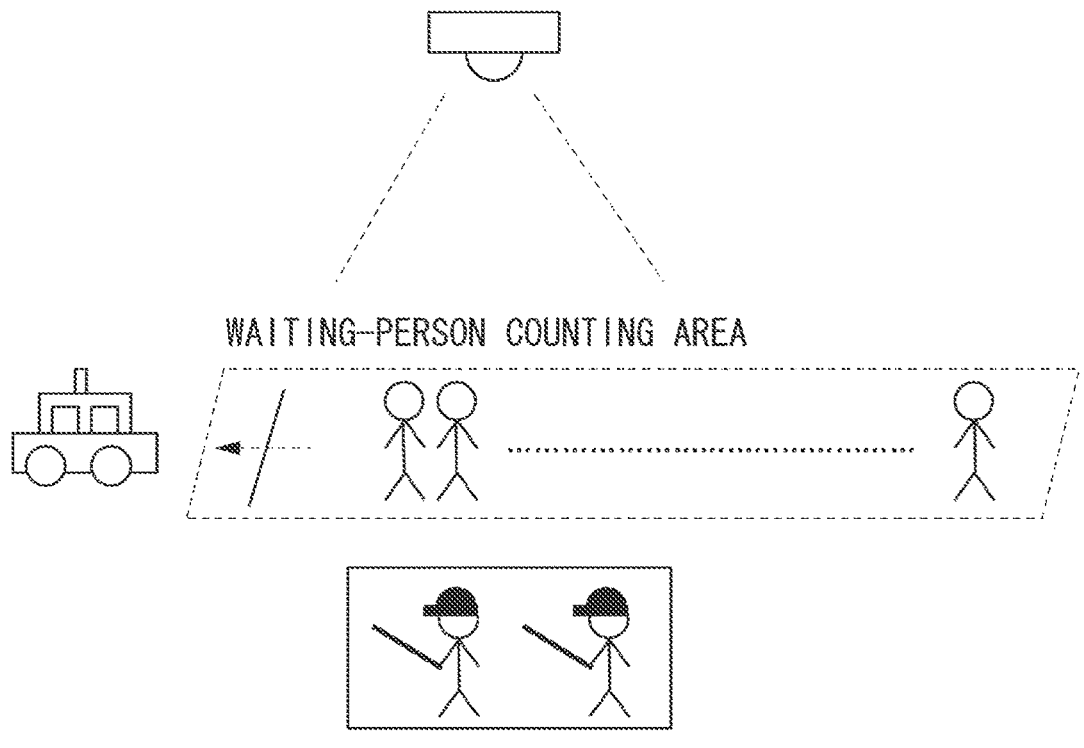

The count unit 113 can change a waiting-person headcount threshold for performing human-body determination processing, based on the size of the acquired waiting-person counting area. In an example illustrated in FIGS. 7A and 7B, the waiting-person headcount threshold is 1 in a case where the waiting-person counting area is less than or equal to a predetermined area (FIG. 7A), and the waiting-person headcount threshold is 2 in a case where the waiting-person counting area is larger than the predetermined area (FIG. 7B).

Based on the processing of the present exemplary embodiment, the waiting-person counting area is variable and thus, an appropriate area for taking a waiting-person headcount can be set. Therefore, a reduction in accuracy of waiting-time prediction can be prevented.

Exemplary embodiments are described above in detail, but these exemplary embodiments are not seen to be limiting.

In each of the above-described exemplary embodiments, the case where human bodies form a queue is described. However, the objects are not limited thereto and can be, for example, human, face, automobiles and animals.

Moreover, the above-described exemplary embodiments may be freely combined.

Based on the processing of each of the above-described exemplary embodiments, a queue waiting time is predicted from a waiting-person headcount in the entire queue and the frequency of passage of a human body forming the queue over a predetermined position, and in this case, human bodies forming the queue and other human bodies are distinguished from each other. Therefore, the queue waiting time can be predicted in fewer processes with higher accuracy.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-005967, filed Jan. 17, 2017, which is hereby incorporated by reference herein in its entirety.

What is claimed is:

1. An information processing apparatus that estimates a waiting time in a queue, the information processing apparatus comprising:
    a first acquisition unit configured to acquire a number of objects waiting in the queue formed in a set area;
    a second acquisition unit configured to acquire a number of objects having passed through a position, corresponding to an exit of the queue, in a first period; and
    an estimation unit configured to estimate the waiting time in the queue, based on the number of objects acquired by the first acquisition unit and the number of objects acquired by the second acquisition unit,
    wherein, in a case where the number of objects acquired by the first acquisition unit is less than or equal to a threshold and passage of an object through the position is not detected for a second period, the estimation unit changes the number of objects acquired by the first acquisition unit, and estimates the waiting time in the queue based on the changed number of objects and the number of objects acquired by the second acquisition unit.

2. The information processing apparatus according to claim 1, wherein the estimation unit changes the number of objects, acquired by the first acquisition unit, to zero.

3. An information processing method that estimates a waiting time in a queue, the information processing method comprising:
    performing first acquisition process for acquiring a number of objects waiting in the queue formed in a set area;
    performing second acquisition process for acquiring a number of objects having passed through a position, corresponding to an exit of the queue, in a first period; and estimating the waiting time in the queue, based on the number of objects acquired by first acquisition process and the number of objects acquired by the second acquisition process, wherein, in a case where the number of objects acquired by the first acquisition process is less than or equal to a threshold and passage of an object through the position is not detected for a second period, changing the number of objects acquired by the first acquisition process, and estimating the waiting time in the queue based on the changed number of objects and the number of objects acquired by the second acquisition process.

4. The information processing method according to claim 3, wherein the number of objects, acquired by the first acquisition process, is changed to zero.

5. A non-transitory computer-readable storage medium storing a program that causes a computer to implement a method that estimates a waiting time in a queue, the method comprising:

performing first acquisition process for acquiring a number of objects waiting in the queue formed in a set area;

performing second acquisition process for acquiring a number of objects having passed through a position, corresponding to an exit of the queue, in a first period; and estimating the waiting time in the queue, based on the number of objects acquired by first acquisition process and the number of objects acquired by the second acquisition process, wherein, in a case where the number of objects acquired by the first acquisition process is less than or equal to a threshold and passage of an object through the position is not detected for a second period, changing the number of objects acquired by the first acquisition process, and estimating the waiting time in the queue based on the changed number of objects and the number of objects acquired by the second acquisition process.

6. The information processing apparatus according to claim 1, further comprising an output unit configured to cause a display to display information indicating the waiting time estimated by the estimation unit.

7. The information processing method according to claim 3, further comprising causing a display to display information indicating the waiting time estimated in the estimating.

8. An information processing apparatus that estimates a waiting time in a queue, the information processing apparatus comprising:

a first acquisition unit configured to acquire a number of objects waiting in the queue formed in a set area;

a second acquisition unit configured to acquire a number of objects having passed through a position, corresponding to an exit of the queue, in a first period; and an estimation unit configured to estimate the waiting time in the queue based on the number of objects acquired by the first acquisition unit and the number of objects acquired by the second acquisition unit, wherein, in a case where the number of objects acquired by the first acquisition unit is less than or equal to a threshold and an object is not detected in a specified area in the set area for a second period, the estimation unit changes the number of objects acquired by the first acquisition unit, and estimates the waiting time in the queue based on the changed number of objects and the number of objects acquired by the second acquisition unit.

9. The information processing apparatus according to claim 8, wherein the estimation unit changes the number of objects, acquired by the first acquisition unit, to zero.

10. The information processing apparatus according to claim 8, further comprising an output unit configured to cause a display to display information indicating the waiting time estimated by the estimation unit.

11. The information processing apparatus according to claim 8, wherein the specified area is a part of the set area and including the position corresponding to the exit of the queue.

12. An information processing method that estimates a waiting time in a queue, the information processing method comprising:

performing first acquisition process for acquiring a number of objects waiting in the queue formed in a set area;

performing second acquisition process for acquiring a number of objects having passed through a position, corresponding to an exit of the queue, in a first period; and estimating the waiting time in the queue based on the number of objects acquired by the first acquisition process and the number of objects acquired by the second acquisition process, wherein, in a case where the number of objects acquired by the first acquisition process is less than or equal to a threshold and an object is not detected in a specified area in the set area for a second period, changing the number of objects acquired by the first acquisition process, and estimating the waiting time in the queue based on the changed number of objects and the number of objects acquired by the second acquisition process.

13. The information processing method according to claim 12, wherein the number of objects, acquired by the first acquisition process, is changed to zero.

14. The information processing method according to claim 12, further comprising causing a display to display information indicating the waiting time estimated in the estimating.

15. The information processing method according to claim 12, wherein the specified area is a part of the set area and including the position corresponding to the exit of the queue.

16. A non-transitory computer-readable storage medium storing a program that causes a computer to implement a method that estimates a waiting time in a queue, the method comprising:

performing first acquisition process for acquiring a number of objects waiting in the queue formed in a set area;

performing second acquisition process for acquiring a number of objects having passed through a position, corresponding to an exit of the queue, in a first period; and estimating the waiting time in the queue based on the number of objects acquired by the first acquisition process and the number of objects acquired by the second acquisition process, wherein, in a case where the number of objects acquired by the first acquisition process is less than or equal to a threshold and an object is not detected in a specified area in the set area for a second period, changing the number of objects acquired by the first acquisition process, and estimating the waiting time in the queue based on the changed number of objects and the number of objects acquired by the second acquisition process.

17. An information processing apparatus that estimates a waiting time in a queue, the information processing apparatus comprising:
- a setting unit configured to set a plurality of set areas each corresponding to a different one of a plurality of time periods;
- a first acquisition unit configured to identify a set area, corresponding to a time period including current time, from the plurality of set areas and acquire a number of objects waiting in the queue formed in the identified set area;
- a second acquisition unit configured to acquire a number of objects having passed through a position, corresponding to an exit of the queue, in a predetermined period; and
- an estimation unit configured to estimate the waiting time in the queue based on the number of objects acquired by the first acquisition unit and the number of objects acquired by the second acquisition unit,
- wherein, in a case where the number of objects acquired by the first acquisition unit is less than or equal to a threshold, the estimation unit changes the number of objects acquired by the first acquisition unit, and estimates the waiting time in the queue based on the changed number of objects and the number of objects acquired by the second acquisition unit.

18. The information processing apparatus according to claim 17, wherein the estimation unit changes the number of objects, acquired by the first acquisition unit, to zero.

19. The information processing apparatus according to claim 17, further comprising an output unit configured to cause a display to display information indicating the waiting time estimated by the estimation unit.

20. The information processing apparatus according to claim 17, wherein the estimation unit changes the threshold based on a size of the identified set area.

21. An information processing method that estimates a waiting time in a queue, the information processing method comprising:
- setting a plurality of set areas each corresponding to a different one of a plurality of time periods;
- identifying a set area, corresponding to a time period including current time, from the plurality of set areas performing first acquisition process for acquiring a number of objects waiting in the queue formed in the identified set area;
- performing second acquisition process for acquiring a number of objects having passed through a position, corresponding to an exit of the queue, in a predetermined period; and
- estimating the waiting time in the queue based on the number of objects acquired by the first acquisition process and the number of objects acquired by the second acquisition process,
- wherein, in a case where the number of objects acquired by the first acquisition process is less than or equal to a threshold, changing the number of objects acquired by the first acquisition process, and estimating the waiting time in the queue based on the changed number of objects and the number of objects acquired by the second acquisition process.

22. The information processing method according to claim 21, wherein the number of objects, acquired by the first acquisition process, is changed to zero.

23. The information processing method according to claim 21, further comprising causing a display to display information indicating the waiting time estimated in the estimating.

24. The information processing method according to claim 21, wherein the threshold is changed based on a size of the identified set area.

25. A non-transitory computer-readable storage medium storing a program that causes a computer to implement a method that estimates a waiting time in a queue, the method comprising:
- setting a plurality of set areas each corresponding to a different one of a plurality of time periods;
- identifying a set area, corresponding to a time period including current time, from the plurality of set areas performing first acquisition process for acquiring a number of objects waiting in the queue formed in the identified set area;
- performing second acquisition process for acquiring a number of objects having passed through a position, corresponding to an exit of the queue, in a predetermined period; and
- estimating the waiting time in the queue based on the number of objects acquired by the first acquisition process and the number of objects acquired by the second acquisition process,
- wherein, in a case where the number of objects acquired by the first acquisition process is less than or equal to a threshold, changing the number of objects acquired by the first acquisition process, and estimating the waiting time in the queue based on the changed number of objects and the number of objects acquired by the second acquisition process.

* * * * *